United States Patent [19]

Heimbigner et al.

[11] Patent Number: 4,570,952
[45] Date of Patent: Feb. 18, 1986

[54] FLUID COLLET CHUCK

[76] Inventors: Thomas Heimbigner, 9488 Vanruiten, Bellflower, 90706; Phillip Stranahan, 2146 Country Club Dr., Glendora, both of Calif. 91740

[21] Appl. No.: 614,068

[22] Filed: May 25, 1984

[51] Int. Cl.⁴ .............................................. B23B 31/30
[52] U.S. Cl. ....................................... 279/20; 408/56; 408/61
[58] Field of Search ...................... 279/20; 408/56, 61; 409/136

[56] References Cited

U.S. PATENT DOCUMENTS 2,889,150  6/1959  Goldring et al. ................. 279/20 X
3,024,030  3/1962  Koch ..................................... 279/20

Primary Examiner—James M. Meister
Attorney, Agent, or Firm—Beehler, Pavitt, Siegemund, Jagger & Martella

[57] ABSTRACT

A chuck provided with a collapsible collet for holding one of a number of twist drills of different diameters is equipped with a holder for the collet, the holder being one for mounting in an appropriate power tool such as a drill press or lathe. There is a stationary sleeve within which rotate the holder, collet and drill. For lubricating and cooling the cutting operation where the drill engages the work, use is made of a pipe fitting in a boss on the stationary sleeve. A fluid line to the pipe fitting continuously supplies a cooling lubricant which flows from there through a succession of passageways in the sleeve and the holder so that the lubricant is ultimately discharged into axially extending slits of the collapsible collet. Emerging from the slits the lubricant flows over the surface of the drill until it reaches the cutting edge, the flow being in sufficient volume to wash away chips.

11 Claims, 4 Drawing Figures

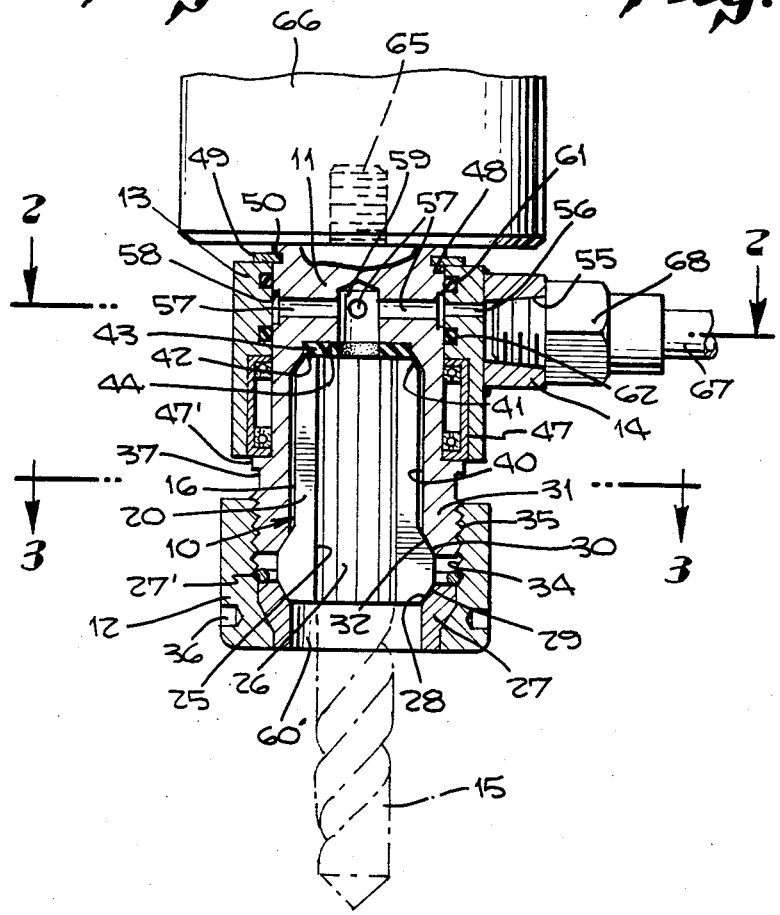
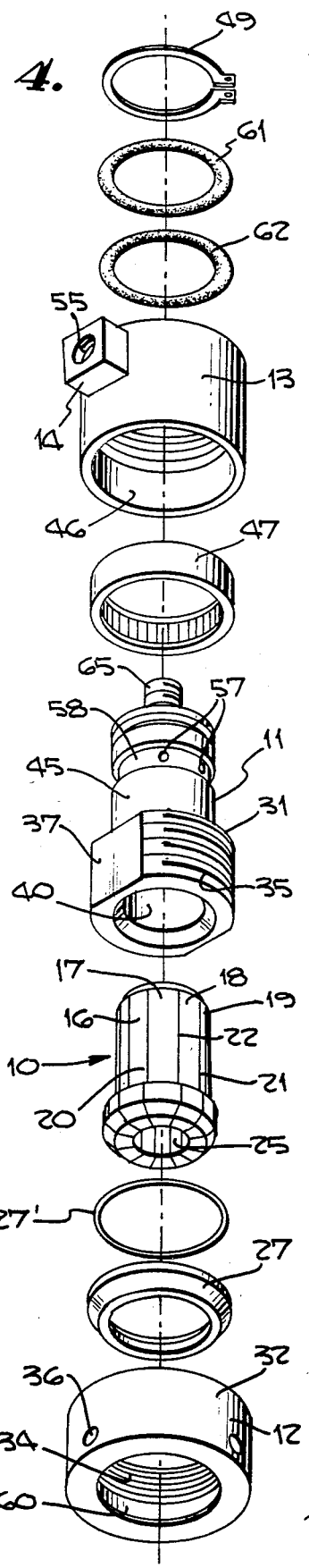
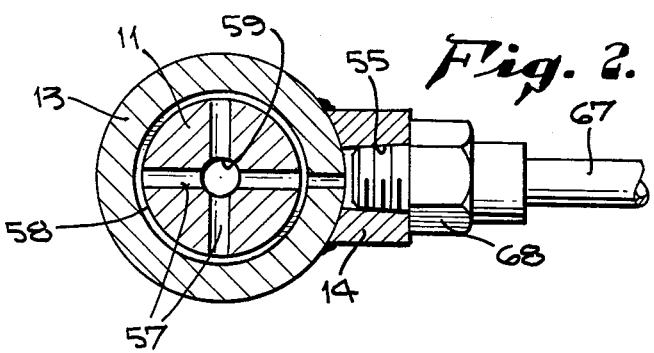
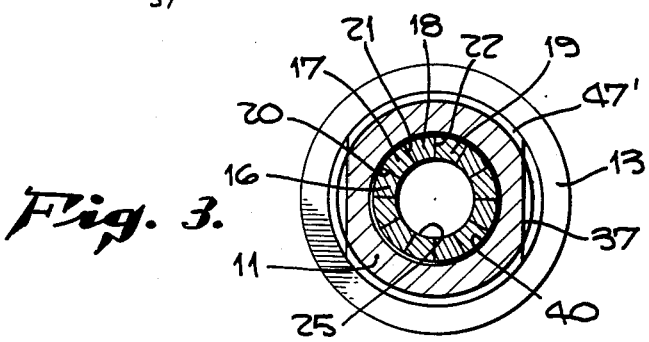

FLUID COLLET CHUCK

A common problem experienced in drilling operations where a conventional twist drill is employed for drilling holes in a metallic workpiece is lubrication and cooling of the drill at its interface with the workpiece and removal of chips generated by the drilling operation. An assortment of rigs, often of a make-shift nature, have been resorted to for directing cutting fluid to the cutting edge of the drill. The usual result is that of delivering an overabundance of the cutting liquid, not only to the drill itself but to the operation in general, the result of which is an untidy operation and augmenting recovery of the spent lubricating oil.

It is among the objects of the invention to provide a new and improved fluid collet chuck capable of providing a constant well directed supply of cutting oil to the drill during the drilling operation by virtue of which the drill can be kept cool and resulting chips washed away.

Another object of the invention is to provide a new and improved fluid collet chuck for a drilling operation by virtue of which the quantity and pressure of fluid supplied to the operation for lubricating, cooling and cleaning can be carefully controlled.

Still another object of the invention is to provide a new and improved fluid collet chuck provided with a sleeve or a jacket by virtue of which a supply of lubricating and cooling liquid is delivered to the chuck in constant supply, there being a system of passages such that the liquid lubricates and cools not only the drill during the cutting operation but also assists in lubricating and cooling mutually rotating parts of the chuck itself.

Further included among the objects of the invention is to provide a fluid collet chuck with a passage system for introduction of a lubricating and cooling fluid, the collet being a split collet for accommodation of a variety of drills of different diameter and wherein the splits in the collet itself become part of the passage system for directing the lubricating liquid to the drill.

Further included among the objects of the invention is to provide a new and improved fluid collet chuck wherein parts of a holder assembly for the collet are not only mutually adjustable so that the collet can be employed for drills of various diameter, but which also can be disengaged for substitution of collet of different capacities to appreciably widen the range of drill sizes which can be accommodated.

Still further among the objects of the invention is to provide a new and improved fluid collet chuck wherein what may be termed the fluid delivery sleeve to which a fluid line may attached need not be stationarily mounted with respect to the operation, but nevertheless remains in a stationary position while the chuck and the drill which it carries rotates within the sleeve and is constantly supplied with the lubricating and cooling liquid.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

IN THE DRAWINGS

FIG. 1 is a longitudinal sectional view of the fluid collet chuck shown mounted in an appropriate power tool.

FIG. 2 is a cross-sectional view on the line 2—2 of FIG. 1.

FIG. 3 is a cross-sectional view on the line 3—3 of FIG. 1.

FIG. 4 is an exploded view of the fluid collet chuck.

In an embodiment of the invention chosen for the purpose of illustration, the fluid collet chuck is embodied in a split collet 10 retained in a holder assembly consisting of a body 11 and cap 12, the body being rotatably mounted relative to a sleeve 13 which carries a boss 14. The fluid collet chuck in assembled position is adapted to have mounted therein a tool such, for example, as a twist drill 15 which, when rotatably driven by a power tool, is adapted to penetrate an appropriate workpiece (not shown).

In the chosen embodiment the collet 10 is constructed of a multiple number of segments 16, 17, 18, 19, etc., separated by respective slits 20, 21, 22, etc. The segments are circumferentially disposed and comprehend a bore 25 which is adapted to receive a shank 26 of the drill 15.

For clamping the collet segments on the shank 26 of the drill, the cap 12 is provided with a retaining ring 27 held in place by a snap ring 27'. On the inner surface of the retaining ring 27 is an annular oblique pressure inducing surface 28. The pressure inducing surface is complementary with respect to an annular oblique pressure receptive surface 29 at the outer end of the collet 10. Axially inward of the pressure receptive surface 29 is a second annular pressure receptive surface 30. For cooperation with the pressure receptive surface 30 a forward portion 31 of the body 11 is provided with an oblique annular pressure inducing surface 32.

In order to compress the collet segments 16, 17, 18, 19, etc., against the shank 26, the cap 12 has threads 34 in engagement with threads 35 on the forward portion 31. The threaded engagement of the cap 12 with the body 11 enables the cap to be threadedly advanced against the body so that the respective pressure inducing surfaces being brought into engagement with the pressure receptive surfaces results in the segments being moved inwardly into engagement with the shank. Spanner wrench holes 36 on the cap providing a wrench hold in cooperation with flats 37 on the body providing a wrench hold enable the cap to be advanced and retracted manually by use of appropriate tools.

For retention of the collet 10 the body 11 is provided with an axially extending recess 40. At the inside end of the collet there is an annular bevel 41 in engagement with an annular surface 42 on the body 11 at the inner end of the recess 40. The annular surface 42 establishes a limit position of the collet in the recess. A non-metallic washer 43 in a complementarily shaped depression 44 cushions projection of the collet into the body.

As clearly depicted in the drawings, the inner end of the body 11 has a cylindrical portion 45 serving as a bearing area for the sleeve 13. One recessed section 46 of the bearing area 45 accommodates a needle bearing ring 47 which is retained by a shoulder 47'. An inner portion of the bearing area is complementary with respect to an inwardly facing bearing area 48 of the sleeve 13. The sleeve 13 is held in the position shown by employment of a snap ring 49 which overlies the sleeve 13 and is engaged in an appropriate snap ring groove 50 in the body 11.

In addition to providing a chuck for mounting and rotating a drill, the chuck is additionally provided with a passage system for enabling a lubricating fluid supplied from an exterior source to be passed through the chuck to a location adjacent the working end of the drill. The passage system is made up of several parts, one of which consits of a threaded opening 55 in the boss 14 to which a conventional pipe line can be attached. The threaded opening communicates with a radially extending outer passageway 56 through the sleeve 13. Radially extending intermediate passageways 57, preferably four in number, communicate with an annular recess 58 on the exterior of the body 11, and in this way communicate with the outer passageway 56. At their inner ends the intermediate passageways 57 empty directly into an axially extending passageway 59 in the body 11. The axially extending passageway 59 communicates at its open end with the recess 40. Slits 20, 21, 22, etc. in effect form a conduit in that fluid from the passageway 59 is conducted through the slits and the space within the recess 40, along the exterior surface of the shank 26, emerging at an outlet opening 60' of the ring 27 enabling the lubricating fluid to flow along the exterior of the drill 15 until it reaches the working end. The ring 27 in turn, is confined within an opening 60 in the cap 12.

To confine the liquid to a degree as it passes through the outer passageway 56 and thence to the intermediate passageway 57, oil ring seals 61 and 62 are made use of mounted in conventional fashion adjacent the compementary bearing areas of the sleeve 13 and body 11.

Not previously mentioned is a projection 65 at the inner end of the body 11 which may have a threaded or other exterior appropriate for mounting the chuck device in a piece of power machinery 66. Although the body 11 with its cap 12 containing the collet 10 and the drill 15 are adapted to be rotated during the work cycle by the power machinery, the sleeve 13 remains in a fixed position so that a line 67 attached to a fitting 68 and carrying lubricant fluid is undisturbed during the operating cycle, inasmuch as the sleeve 13 remains stationary. As a consequence, whatever source of lubricant may be appropriate, it is, nevertheless, one which can be in constant communication with the collet chuck. In addition to being in constant communication, the liquid line may be fed under either gravity pressure or other pressure, if need be, in order to make sure that a sufficient amount of lubricant is available at all times for tool operation. The steady supply of lubricant, serving also as a coolant and wash, is useful in lubricating engagement of the tool holder with the sleeve, lubricating the engagement of collet segments with the body and each other and also providing lubricant for the interface between the drill and the workpiece. The system is equally effective whether put to use in operation of a split collet of the size shown in the drawing or a split collet having a bore 25 of some different diameter for a range of drills 15 of correspondingly different diameter.

While a particular embodiment of the present invention has been shown and described, it will be obvious to those skilled in the art that changes and modifications may be made without departing from the invention in its broader aspects and, therefore, the aims of its appended claims are to cover all such changes and modifications as fall within the true spirit and scope of this invention.

Having described the invention, what is claimed as new in support of Letters Patent is as follows:

1. A chuck device for a drill having a working end and at the other end a retention shank, said chuck device being adapted to supply fluid to the interface of the working end with a workpiece and comprising a collet having a bore therein for retention of the shank of the drill, a conduit between inner and outer ends of said collet, a rotatable holder assembly for retention of the collet having a recess with an opening at one end for reception of the collet, the other end of said holder assembly being adapted for mounting on a rotating power device, a relatively stationary sleeve having an axially disposed chamber, said holder assembly having a rotatable mounting in said chamber, and a passage system between said sleeve and said conduit for passing fluid from a source exterior with respect to the sleeve to said conduit during rotation of the holder assembly while work is performed on said workpiece.

2. A chuck device for a drill as in claim 1 wherein said collet comprises a plurality of circumferentially disposed segments and said conduit comprises a plurality of axially extending slits intermediate said segments.

3. A chuck device for a drill as in claim 1 wherein holder assembly comprises a body and a cap in rotationally releasable engagement with said body, pressure receptive means on the exterior of the collet and pressure inducing means on the holder assembly in engagement with said pressure receptive means whereby to accommodate drills of different nominal size in said collet.

4. A chuck device for a drill as in claim 1 wherein there is a non-metallic pad at the interior of the recess in the holder assembly comprising means separating the inner end of the collet and the holder assembly.

5. A chuck device for a drill as in claim 3 wherein there are axially outer and inner pressure receptive surface means on said collet and respective axially outer and inner pressure inducing surface means on said holder device, said surface means being operable in response to movement of said cap relative to said body to alternatively compress said collet into engagement with drills of different diameters and release said collet for expansion and release of said drills.

6. A chuck device for a drill as in claim 3 wherein there is a wrench hold on said cap and a wrench hold on said body.

7. A chuck device for a drill as in claim 1 wherein said rotatable mounting comprises means forming a recess in said sleeve and a low friction bearing assembly in said recess.

8. A chuck device for a drill as in claim 1 wherein said passage system comprises an outer passageway between the exterior and interior of said sleeve, an axially extending passageway in said holder in communication at one end with said recess in the holder, and an intermediate radially extending passageway between the other end of said axially extending passageway and said outer passageway.

9. A chuck device for a drill as in claim 8 wherein there is an annular passageway on the exterior of said holder assembly in communication between said outer passageway and said radially extending passageway.

10. A chuck device for a drill as in claim 8 wherein there is a boss on the exterior of the sleeve adjacent said outer passageway, said boss having a fluid line connection in communication with said outer passageway.

11. A chuck device for a drill as in claim 8 wherein the interior of said sleeve and the exterior of said holder assembly have complementary annular bearing areas, the bearing area of said sleeve having a first portion in direct bearing engagement with the bearing area of said holder assembly, a second portion of said bearing area of the sleeve having an annular recess therein and a low friction bearing ring in said annular recess, said outer passageway being located in said first portion.

* * * * *